United States Patent
Zeng et al.

(10) Patent No.: US 10,979,110 B2
(45) Date of Patent: Apr. 13, 2021

(54) COOPERATIVE PRECODING METHOD AND COMMUNICATION SYSTEM

(71) Applicant: Realtek Semiconductor Corp., HsinChu (TW)

(72) Inventors: Chih-Hsiu Zeng, New Taipei (TW); Kwang-Cheng Chen, Tampa, FL (US); Der-Zheng Liu, Hsinchu County (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/877,467

(22) Filed: May 18, 2020

(65) Prior Publication Data
US 2021/0006304 A1 Jan. 7, 2021

Related U.S. Application Data

(60) Provisional application No. 62/870,681, filed on Jul. 4, 2019.

(51) Int. Cl.
| | | |
|---|---|---|
| *H04B 7/0456* | (2017.01) | |
| *H04B 7/026* | (2017.01) | |
| *H04L 27/26* | (2006.01) | |

(52) U.S. Cl.
CPC .......... *H04B 7/0456* (2013.01); *H04B 7/026* (2013.01); *H04L 27/2646* (2013.01); *H04L 27/2657* (2013.01)

(58) Field of Classification Search
CPC .............. H04B 7/0456; H04L 27/2657; H04L 27/2646; H04L 27/2626
USPC ......................................................... 375/267
See application file for complete search history.

(56) References Cited

U.S. PATENT DOCUMENTS

2019/0181994 A1* 6/2019 Chen ................... H04L 27/0014

* cited by examiner

*Primary Examiner* — Leila Malek
(74) *Attorney, Agent, or Firm* — Winston Hsu

(57) ABSTRACT

A cooperative precoding method, applied in a communication system comprising a coordinating device and multiple serving stations, is provided. The cooperative precoding method includes the following steps: the coordinating device obtaining multiple carrier frequency offset (CFO) parameters of the serving stations with respect to a user device; generating multiple cooperative encoded sequences; assigning the cooperative encoded sequences to the serving stations, respectively, according to an order of the plurality of CFO parameters; and the plurality of serving stations transmitting the cooperative encoded sequences, respectively, to the user device. Each cooperative encoded sequence is transmitted over multiple subcarriers.

14 Claims, 7 Drawing Sheets

COOPERATIVE PRECODING METHOD AND COMMUNICATION SYSTEM

CROSS REFERENCE TO RELATED APPLICATIONS

This application claims the benefit of U.S. provisional application No. 62/870,681, filed on Jul. 4, 2019, which is incorporated herein by reference.

BACKGROUND OF THE INVENTION

1. Field of the Invention

The present application relates to a cooperative precoding method and a communication system, and more particularly, to a cooperative precoding method and a communication system capable of dealing with a multi-CFO issue in the cooperative precoding scheme.

2. Description of the Prior Art

In an autonomous vehicles (AVs) application, one vehicle may be served by multiple serving access points (APs). A virtual cell oriented from (or centered at) the vehicle is formed. Within the virtual cell, the serving APs which serve the vehicle may be coordinated by an anchor node. It is feasible to exploit a cooperative precoding scheme within the virtual cell. The cooperative precoding scheme has benefit of transmit diversity gain, which can enhance link quality.

Practically, carrier frequency offset (CFO) is an inherent problem for an OFDM (orthogonal frequency division multiplexing) system. For the virtual cell, the CFO problem becomes serious since every AP (transmitter) has its own CFO with respect to the vehicle (receiver) and CFOs of the APs may be different. In short, the cooperative precoding design would face a multi-CFO issue.

Therefore, how to deal with the multi-CFO issue in the cooperative precoding design is a significant objective in the field.

SUMMARY OF THE INVENTION

It is therefore a primary objective of the present application to provide a cooperative precoding method and a communication system capable of dealing with a multi-CFO issue in the cooperative precoding scheme.

An embodiment of the present application provides a cooperative precoding method which is applied in a communication system including a coordinating device and multiple serving stations. The cooperative precoding method includes the following steps: the coordinating device obtaining multiple carrier frequency offset (CFO) parameters of the serving stations with respect to a user device; generating multiple cooperative encoded sequences; assigning the cooperative encoded sequences to the serving stations, respectively, according to an order of the CFO parameters; and the serving stations transmitting the cooperative encoded sequences, respectively, to the user device. Each cooperative encoded sequence is transmitted over multiple subcarriers.

An embodiment of the present application further provides a communication system. The communication system includes a coordinating device and multiple serving stations, in which the serving stations are coupled to the coordinating device, configured to transmit multiple cooperative encoded sequences, respectively, to a user device, and each cooperative encoded sequence is transmitted over multiple subcarriers. The coordinating device obtains multiple carrier frequency offset (CFO) parameters of the serving stations with respect to the user device. The coordinating device assigns one cooperative encoded sequence to one serving station according to an order of the CFO parameters.

An embodiment of the present application further provides a cooperative precoding method which is applied in a communication system including a coordinating device and multiple serving stations. The cooperative precoding method includes the following steps: generating multiple cooperative encoded sequences; and the coordinating device coordinating the serving stations, such that the serving stations transmit the cooperative encoded sequences, respectively, to the user device, in which each cooperative encoded sequence is transmitted over multiple subcarriers. The step of generating the cooperative encoded sequences includes the following steps: performing a shift-and-multiply operation zero, one or multiple times on the original sequence, and the shift-and-multiply operation includes the following steps: obtaining a first cooperative encoded sequence; circularly shifting the first cooperative encoded sequence by K elements, so as to obtain a circular-shifted sequence, in which K is an integer larger than 1; and multiplying K leading elements of the circular-shifted sequence by a complex constant, so as to obtain a second cooperative encoded sequence.

An embodiment of the present application further provides a communication system. The communication system includes a coordinating device and multiple serving stations. The serving stations are coupled to the coordinating device, configured to transmit multiple cooperative encoded sequences, respectively, to a user device, in which each cooperative encoded sequence is transmitted over multiple subcarriers. The cooperative encoded sequences include an original sequence, the cooperative encoded sequences are generated by performing a shift-and-multiply operation zero, one or multiple times on the original sequence, and the shift-and-multiply operation includes the following steps: obtaining a first cooperative encoded sequence; circularly shifting the first cooperative encoded sequence by K elements, so as to obtain a circular-shifted sequence, in which K is an integer larger than 1; and multiplying K leading elements of the circular-shifted sequence by a complex constant, so as to obtain a second cooperative encoded sequence.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
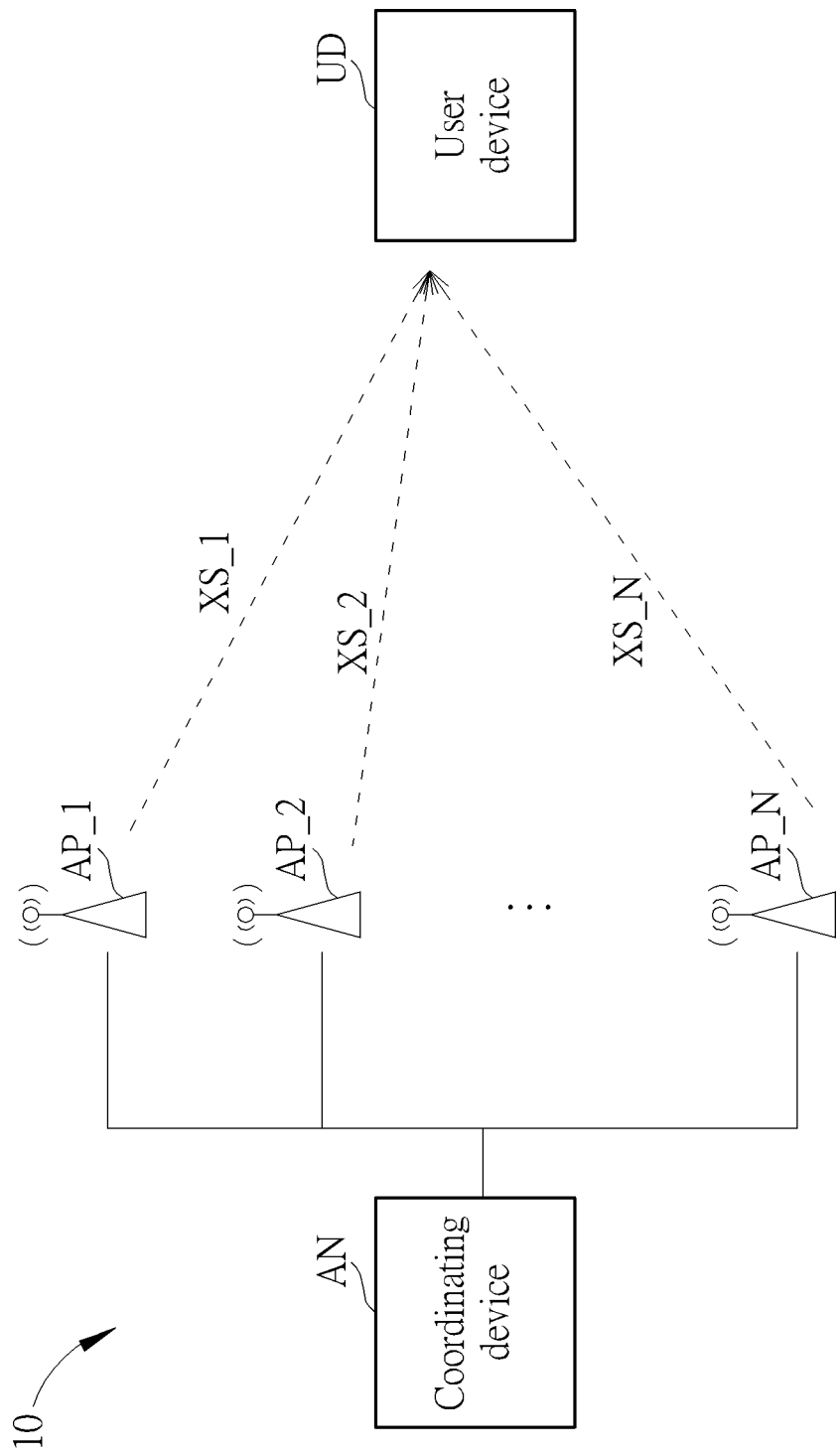
FIG. 1 is a schematic diagram of a communication system according to an embodiment of the present application.

FIG. 1 is a schematic diagram of a communication system 10 according to an embodiment of the present application. The communication system 10 comprises a coordinating device AN and a plurality of serving stations AP_1-AP_N coupled to the coordinating device AN. In some embodiments, the serving stations AP_1-AP_N may be access points (APs), and the coordinating device AN may be an anchor node which may be a computing device such as a computer or a server. The communication system 10 is able to realize a cooperative precoding transmission scheme. That is, the coordinating device AN may coordinate the serving stations AP_1-AP_N to transmit cooperative encoded sequences XS_1-XS_N to a user device UD, such that the user device UD may gain better link quality, compared to the scenario without cooperation/coordination. The user device UD may be disposed within a vehicle, which is not limited thereto.

The communication system 10 may operate under an OFDM (Orthogonal Frequency Division Multiplexing) transmission scheme, and the cooperative encoded sequences XS_1-XS_N may be transmitted over a plurality of subcarriers (e.g., $\eta$ subcarriers) among total subcarriers (e.g., $N_{FFT}$ subcarriers). That is, the $\eta$ subcarriers may form a subset of the total $N_{FFT}$ subcarriers of the OFDM system.

In an embodiment, the serving stations AP_1-AP_N may be equipped with one antenna and the user device UD may be equipped with $N_{rx}$ antenna(s).

For illustrative purpose, the cooperative encoded sequences XS_1-XS_N transmitted by the serving stations AP_1-AP_N may be represented as a set ECS={$X_{(0)}$, $X_{(1)}$, ..., $X_{(N-1)}$}, where $X_{(n)}$ within the set ECS is one of the cooperative encoded sequences XS_1-XS_N. Without loss of generality, $X_{(0)}$ may be viewed as an original/initial encoded sequence, which may be represented in a vector form as $X_{(0)} = [X_q, X_{q+1}, \ldots, X_{q+\eta-1}]^T$, where $X_q$ is a data symbol transmitted on the q-th subcarrier (or the subcarrier q). Referring to an encoding scheme introduced in the publication of F. Oggier and B. Hassibi, "An algebraic coding scheme for wireless relay networks with multiple-antenna nodes," *IEEE Trans. Signal Process.*, vol. 56, no. 7, July 2008 (hereinafter, "[1]"), $X_{(n)}$ can be generated by computing $X_{(n)} = M_\eta^{n-1} X_{(0)}$ (eq. 1), which is to multiply $X_{(0)}$ by the matrix $M_\eta$ by (n-1) times, where the matrix M, may be expressed as eq. 2. Note that, multiplying $X_{(0)}$ by $M_\eta$ (one or multiple times) is equivalent to performing a shift-and-multiply operation SM1 on $X_{(0)}$ (one or multiple times). That is, the matrix representation of the shift-and-multiply operation SM1 is the matrix $M_\eta$. Alternatively, $X_{(n)}$ may also be represented as $X_{(n)} = M_\eta X_{(n-1)}$. In an embodiment, $\gamma$ can be any non-zero number. In an embodiment, $\gamma = i = \sqrt{-1}$. Unless specified, the following description would assume $\gamma = i = \sqrt{-1}$.

$$M_\eta = \begin{bmatrix} 0_{1 \times (\eta-1)} & \gamma \\ I_{(\eta-1)} & 0_{(\eta-1) \times 1} \end{bmatrix} \quad \text{(eq. 2)}$$

Figure 2:
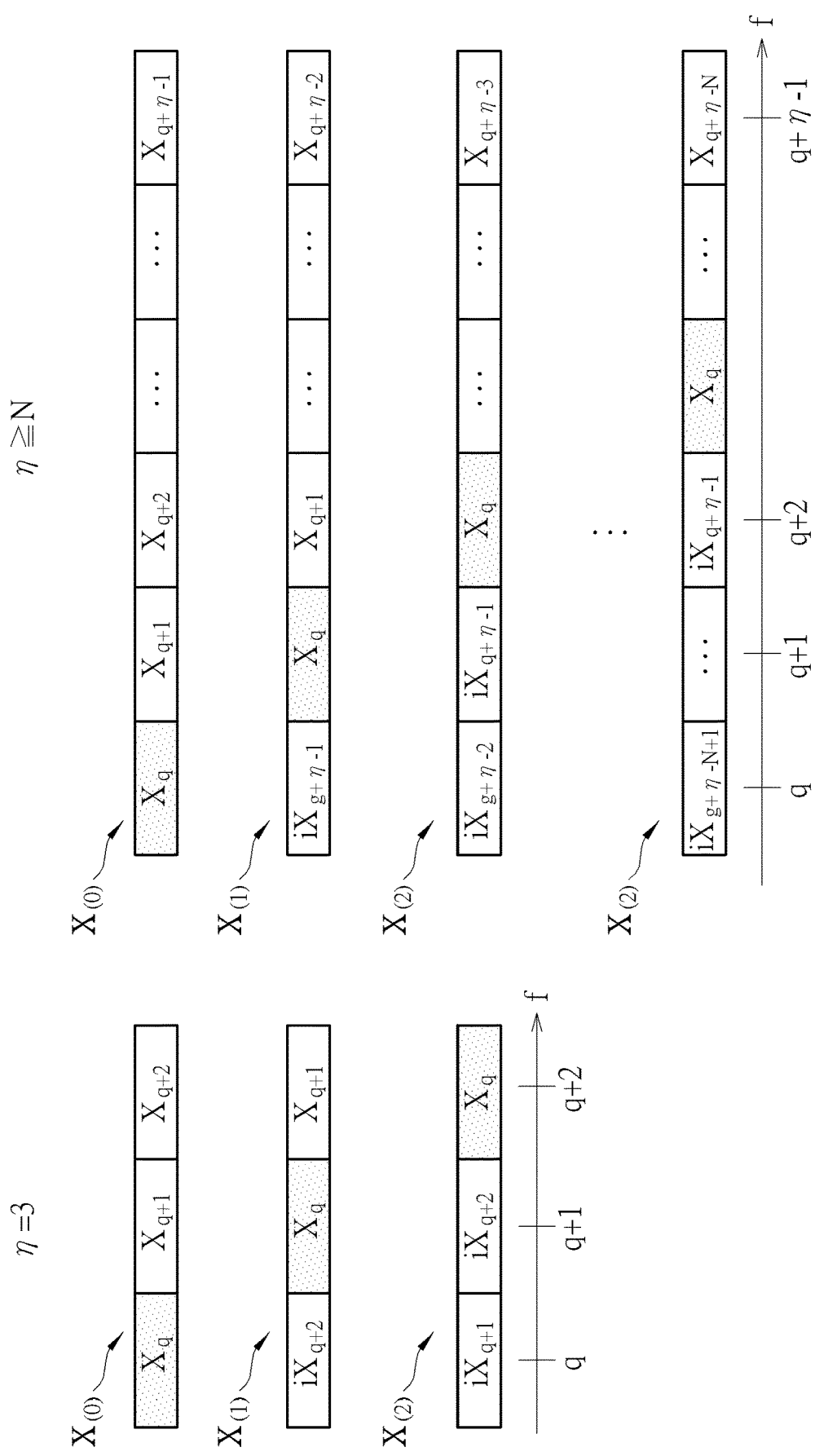
FIG. 2 illustrates a plurality of cooperative encoded sequences according to embodiments of the present application.

For simplicity, take $\eta=3$ as an example, given $X_{(0)} = [X_q, X_{q+1}, X_{q+2}]^T$, from eq. 1, it can be obtained that $X_{(1)} = [i X_{q+2}, X_q, X_{q+1}]^T$ and $X_{(2)} = [i X_{q+1}, i X_{q+2}, X_q]^T$, as a left portion of FIG. 2 illustrates. Furthermore, from the left portion of FIG. 2, given that $X_{(0)}, X_{(1)}, X_{(2)}$ are transmitted by the serving stations simultaneously, "$X_q$ within $X_{(0)}$", "i $X_{q+2}$ within $X_{(1)}$" and "i $X_{q+1}$ within $X_{(2)}$" are transmitted at the q-th subcarrier. Similarly, "$X_{q+1}$ within $X_{(0)}$", "$X_q$ within $X_{(1)}$" and "i $X_{q+2}$ within $X_{(2)}$" are transmitted at the (q+1)-th subcarrier. "$X_{q+2}$ within $X_{(0)}$", "$X_{q+1}$ within $X_{(1)}$" and "$X_q$ within $X_{(2)}$" are transmitted at the (q+2)-th subcarrier.

Supposed that the subcarriers number $\eta$ is larger than the serving stations number N, i.e., $\eta \geq N$, and $X_{(0)} = [X_q, X_{q+1}, \ldots, X_{q+\eta-1}]^T$, the encoded sequences would be $X_{(1)} = [i X_{q+\eta-1}, X_q, \ldots, X_{q+\eta-2}]^T$, $X_{(2)} = [i X_{q+\eta-2}, i X_{q+\eta-1}, X_q, \ldots, X_{q+\eta-3}]^T$ ..., and $X_{(N-1)} = [i X_{q+\eta-N+1}, i X_{q+\eta-N+2}, \ldots, i X_{q+\eta-1}, X_q, \ldots, X_{q+\eta-N}]^T$, as a right portion of FIG. 2 illustrates.

Equivalently, the shift-and-multiply operation SM1 is to circularly shift a first cooperative encoded sequence (e.g., $X_{(2)} = [i X_{q+\eta-2}, i X_{q+\eta-1}, X_q, \ldots, X_{q+\eta-3}]^T$) by "1" element, so as to obtain a circular-shifted sequence (e.g., $CS_1(X_{(2)}) = [X_{q+\eta-3}, i X_{q+\eta-2}, i X_{q+\eta-1}, X_q, \ldots, X_{q+\eta-4}]^T$, where $CS_1(\cdot)$ denotes a circularly shifting operation corresponding to shifting 1 element, and a matrix representation of the circularly shifting operation $CS_1$, denoted as $\tilde{M}_\eta$ expressed as eq. 3), and to multiply a leading element of the circular-shifted sequence (e.g., $X_{q+\eta-3}$ within $CS_1(X_{(2)})$) by the complex constant $\gamma$, so as to obtain a second cooperative encoded sequence (e.g., $X_{(3)} = [i X_{q+\eta-3}, X_{q+\eta-2}, i X_{q+\eta-1}, X_q, \ldots, X_{q+\eta-4}]^T$).

$$\tilde{M}_\eta = \begin{bmatrix} 0_{1 \times (\eta-1)} & \gamma \\ I_{(\eta-1)} & 0_{(\eta-1) \times 1} \end{bmatrix} \quad \text{(eq. 3)}$$

Note that, in the embodiment of $\gamma = i = \sqrt{-1}$, multiplying the leading element of the circular-shifted sequence (e.g., $X_{q+\eta-3}$ within $CS(X_{(2)})$) by the complex constant i is equivalent to rotating the leading element (e.g., $X_{q+\eta-3}$ within $CS(X_{(2)})$) 90 degrees in a complex plane.

Given that the cooperative encoded sequences $X_{(0)}, X_{(1)}, \ldots, X_{(N-1)}$ is generated, the communication system 10 would determine which cooperative encoded sequence is transmitted by which serving station, in order to further combat against carrier frequency offset (CFO). That is, to further enhance the link quality which suffers from CFO, the communication system 10 may assign one cooperative encoded sequence, e.g., $X_{(n)}$, to a particular serving station within the serving stations AP_1-AP_N.

Figure 3:
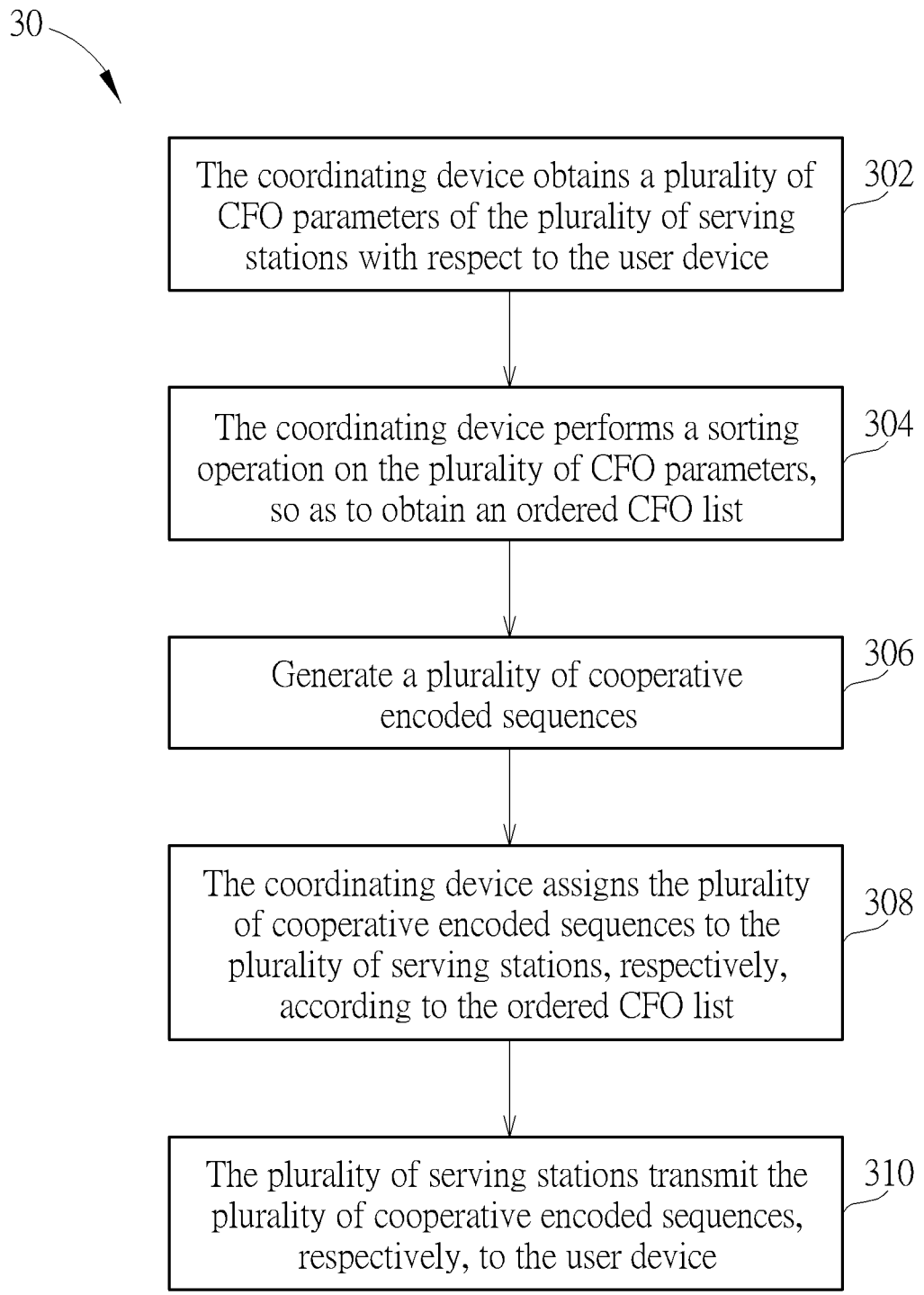
FIG. 3 is a schematic diagram of a process according to an embodiment of the present application.

In an embodiment, the communication system 10 may perform a process 30 to assign each cooperative encoded sequence to an appropriate serving station, so as to overcome the CFO imperfection. As FIG. 3 illustrates, the process 30 comprises the following steps.

Step 302: The coordinating device obtains a plurality of CFO parameters of the plurality of serving stations with respect to the user device.

Step 304: The coordinating device performs a sorting operation on the plurality of CFO parameters, so as to obtain an ordered CFO list.

Step 306: Generate a plurality of cooperative encoded sequences.

Step 308: The coordinating device assigns the plurality of cooperative encoded sequences to the plurality of serving stations, respectively, according to the ordered CFO list.

Step 310: The plurality of serving stations transmit the plurality of cooperative encoded sequences, respectively, to the user device.

In Step 302, the coordinating device AN obtains a plurality of CFO parameters $\varepsilon_1$-$\varepsilon_N$ of the plurality of serving stations AP_1-AP_N with respect to the user device UD.

As known in the art, the CFO parameter $\varepsilon_n$ (corresponding to serving station AP_n) may be expressed as $\varepsilon_n = f_{c,n} - f_{c,r}$. The frequency $f_{c,n}$ represents the actual carrier/central frequency transmitted from the serving station AP_n, related to the local oscillator of the radio frequency (RF) chain within the serving station AP_n. The frequency $f_{c,r}$ represents the carrier/central frequency corresponding to the local oscillator of the RF chain within the user device UD. In addition, the CFO parameter $\varepsilon_n$ is also used to parameterize the CFO matrix $C(\varepsilon_n) = FD(\varepsilon_n)F^H$ and the signature waveform $c_k(\varepsilon_n)$ corresponding to the k-th subcarrier of the serving station AP_n, the k-th column vector of the CFO matrix, i.e., $c_k(\varepsilon_n) = C(\varepsilon_n) e_k$, where $D(\varepsilon_n)$ is a diagonal matric which is expressed as eq. 4, F represents an FFT (Fast Fourier Transform) matrix with size $N_{FFT}$, and $e_k$ is a $N_{FFT} \times 1$ vector containing all zero entries except the k-th entry which is 1.

$$D(\varepsilon_n) = \text{diag}\left(1, \exp\left(j\left(\frac{2\pi}{N_{FFT}}\right)\varepsilon_n\right), \ldots, \exp\left(j\left(\frac{(N_{FFT}-1)2\pi}{N_{FFT}}\right)\varepsilon_n\right)\right) \quad \text{(eq. 4)}$$

In an embodiment, the serving stations AP_1-AP_N may send the corresponding CFO parameters $\varepsilon_1$-$\varepsilon_N$ to the coordinating device AN via the connections in between.

In Step 304, the coordinating device AN performs a sorting operation on the plurality of CFO parameters $\varepsilon_1$-$\varepsilon_N$, so as to obtain an ordered CFO list CL.

In an embodiment, the coordinating device AN may perform an ascending sorting operation on the plurality of CFO parameters $\varepsilon_1$-$\varepsilon_N$ to obtain the ordered CFO list CL, which can be expressed as $CL = \{\varepsilon_{(1)} \leq \varepsilon_{(2)} \leq \ldots \leq \varepsilon_{(N)}\} = \text{sort}_a(\varepsilon_1, \ldots, \varepsilon_N)$, where $\text{sort}_a(\cdot)$ denotes the ascending sorting operation. The index "(n)" in the subscript with parenthesis represents the ordered index, which is to index the ordered CFO parameters within the ordered CFO list CL. The CFO parameter $\varepsilon_{(n)}$, which is one of the CFO parameters $\varepsilon_1$-$\varepsilon_N$, is corresponding to the serving station AP_(n), and vice versa. Hence, the serving stations AP_(1)-AP_(N) are corresponding to the CFO parameters $\varepsilon_{(1)}$-$\varepsilon_{(N)}$ within the ordered list CL.

Note that, a set formed by the serving stations AP_1-AP_N is the same as a set formed by serving stations AP_(1)-AP_(N). The difference between AP_1-AP_N and AP_(1)-AP_(N) is that AP_(1)-AP_(N) are ordered and represented by the ordered index according to the CFO parameters $\varepsilon_{(1)}$-$\varepsilon_{(N)}$ within the ordered list CL.

In Step 306, the communication system 10 may generate the cooperative encoded sequences $X_{(0)}, X_{(1)}, \ldots, X_{(N-1)}$ according to eq. 1. The cooperative encoded sequences $X_{(0)}, X_{(1)}, \ldots, X_{(N-1)}$ may be generated either by the coordinating device AN or by the serving stations AP_1-AP_N which is not limited thereto.

Furthermore, in Step 308, the coordinating device AN may assign the cooperative encoded sequences $X_{(0)}, X_{(1)}, \ldots, X_{(N-1)}$ to the serving stations AP_1-AP_N. Specifically, the coordinating device AN may assign the cooperative encoded sequences $X_{(0)}, X_{(1)}, \ldots, X_{(N-1)}$ to the serving stations AP_(1)-AP_(N), respectively, such that, in Step 310, the serving stations AP_(1)-AP_(N) transmit the cooperative encoded sequences $X_{(0)}, X_{(1)}, \ldots, X_{(N-1)}$, respectively, to the user device UD. Specifically, the coordinating device AN in Step 308 may assign the cooperative encoded sequence $X_{(n-1)}$ to the serving station AP_(n), such that in Step 310, the serving station AP_(n) may transmit the cooperative encoded sequence $X_{(n-1)}$ to the user device UD.

In an embodiment, the coordinating device AN may generate the cooperative encoded sequence $X_{(n-1)}$ and send the cooperative encoded sequence $X_{(n-1)}$ to the serving station AP_(n).

In another embodiment, the coordinating device AN may broadcast the original/initial encoded sequence $X_{(0)}$ to the serving stations AP_1-AP_N (or equivalently, AP_(1)-AP_(N)). Further, for the serving station AP_(n), to which the cooperative encoded sequence $X_{(n-1)}$ is assigned, the coordinating device AN may send the ordered index (n−1) to the serving station AP_(n), and therefore the serving station AP_(n) may generate $X_{(n-1)} = M_\eta^{(n-1)-1} X_{(0)}$ (eq. 5) by itself. Note that, "(n−1)−1" in eq. 5 represents an operational times for the serving station AP_(n) to generate $X_{(n-1)}$, and "(n−1)" either the left side of eq. 5 refers to the ordered index "(n−1)". In the current embodiment, it is equivalent that the coordinating device AN determines the operational times "(n−1)−1", and the serving station AP_(n) to generate $X_{(n-1)}$ according to the operational times "(n−1)−1", where the operational times "(n−1)−1" is the ordered index "(n−1)" minus 1.

Figure 4:
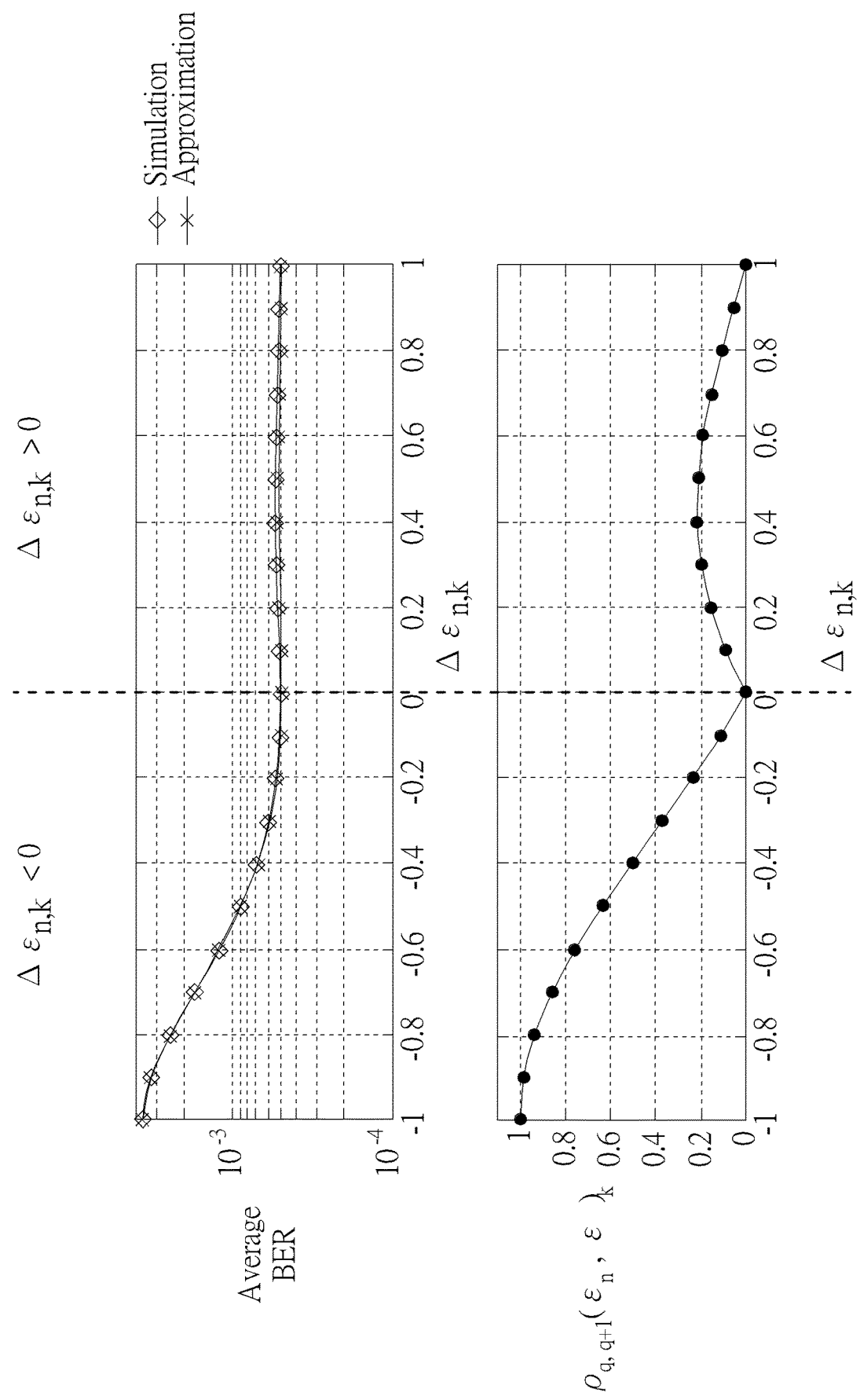
FIG. 4 illustrates an average bit error rate (BER) and a correlation of an embodiment of the present application.

Rationale behind the process 30 is that, for two serving stations AP_n and AP_k, simulation results show that link quality in terms of bit error rate (BER) would degrade as a CFO difference $\Delta\varepsilon_{n,k} = \varepsilon_n - \varepsilon_k$ becomes negative. Referring to FIG. 4, in which an average BER performance and a correlation $|\rho_{q,q+1}(\varepsilon_n, \varepsilon_k)|$ between $c_q(\varepsilon_n)$ and $c_{q+1}(\varepsilon_k)$ is plotted, where $\rho_{q,q+1}(\varepsilon_n, \varepsilon_k)$ is defined as eq. 6 below. In FIG. 4, a scenario of two serving stations AP_n and AP_k, BPSK (binary phase shift keying), $N_{rx} = 2$, $(A_n/\sigma_n^2) = (A_k/\sigma_n^2) = 5$ dB, and $\Delta\varepsilon_{n,k} = \varepsilon_n - \varepsilon_k \in [-1, 1]$ (which has been normalized) is simulated, where $A_n/A_k$ represents channel gain (power) from the serving station AP_n/AP_k to the user device UD, and $\sigma_n^2$ represents noise power. For producing the simulation results of FIG. 4, it is assumed that the serving station AP_n transmits $XS\_n = [X_q, 0, \ldots]^T$ and the serving station AP_k transmits $XS\_k = [0, X_q, \ldots]^T$. In addition, MRC (maximum ratio combining) technique is assumed to be used in the user device UD. As can be seen from FIG. 4, when $\Delta\varepsilon_{n,k}$ is negative and approaches to −1, the correlation $|\rho_{q,q+1}(\varepsilon_n, \varepsilon_k)|$ increases and approaches to +1, and the BER performance degrades significantly, due to CFO imperfection. On the other hand, when $\Delta\varepsilon_{n,k}$ is positive, $|\rho_{q,q+1}(\varepsilon_n, \varepsilon_k)|$ is less than 0.22 and the BER performance remains more or less the same. Thus, it can be inferred from FIG. 4 that the BER performance would be significantly affected by the correlation $|\rho_{q,q+1}(\varepsilon_n, \varepsilon_k)|$, especially when $\Delta\varepsilon_{n,k} < 0$. Inspired by the simulation results shown in FIG. 4, the present application utilizes the sorting operation in Step 304 to make sure that $\Delta\varepsilon_{n,k} \geq 0$ for all n>k. Therefore, the communication system 10 performing the process 30 may be immune to the CFO imperfection, and be able to deal with the multi-CFO issue.

$$\rho_{q,q+1}(\varepsilon_n, \varepsilon_k) = \frac{c_{q+1}^H(\varepsilon_k) c_q(\varepsilon_n)}{\|c_{q+1}(\varepsilon_k)\| \|c_q(\varepsilon_n)\|} \quad \text{(eq. 6)}$$

In the embodiment of the process 30, the subcarriers number $\eta$ is larger than the serving stations number N, i.e., $\eta \geq N$.

Note that, the process 30 requires the serving stations to feedback the CFO information to the coordinating device AN, which occupies more network resources for feedback mechanism.

Figure 5:
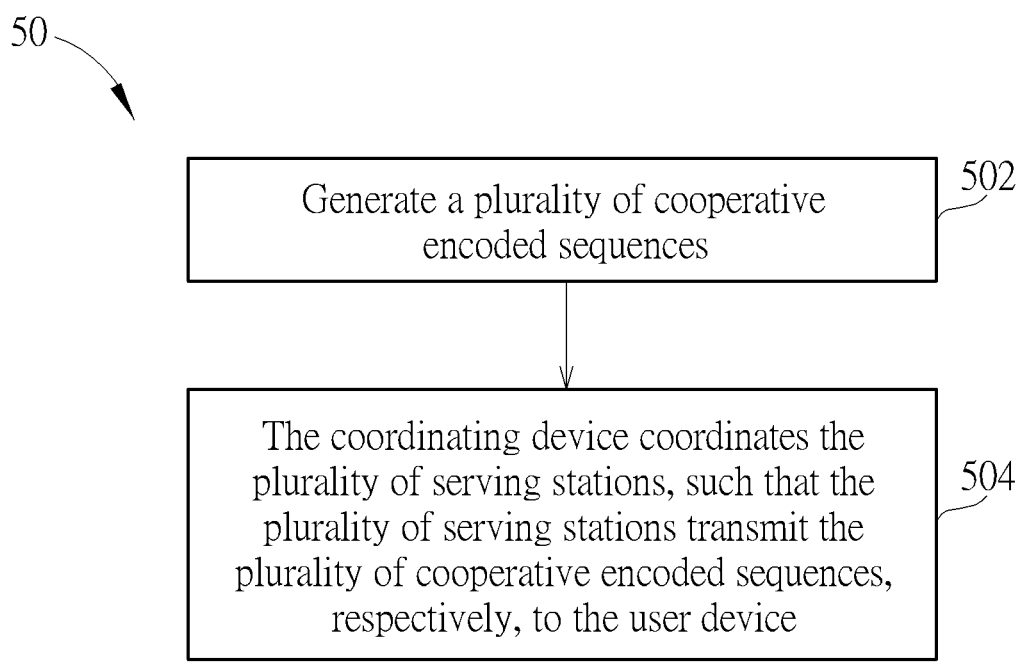
FIG. 5 is a schematic diagram of a process according to an embodiment of the present application.

Alternatively, the communication system 10 may perform a process 50 to perform another cooperative precoding scheme to overcome the CFO imperfection. As FIG. 5 illustrates, the process 50 comprises the following steps.

Step 502: Generate a plurality of cooperative encoded sequences.

Step 504: The coordinating device coordinates the plurality of serving stations, such that the plurality of serving stations transmit the plurality of cooperative encoded sequences, respectively, to the user device.

In the embodiment of the process 50, it is assumed that the number of subcarriers $\eta$ is larger than K times the number of serving stations N, i.e., $\eta \geq K$ N, where K is an integer larger than 1.

In Step 502, the coordinating device AN or the serving stations AP_1-AP_N generates the cooperative encoded sequences XS_1-XS_N, forming a set ECS'={$X_{(0)}$, $X'_{(1)}$, ..., $X'_{(N-1)}$}. Different from the sequence $X_{(n)}$ generated by eq. 1, $X'_{(n)}$ within the set ECS' is generated by computing $X'_{(n)} = M_\eta^{K(n-1)} X_{(0)}$ (eq. 7). In other words, the coordinating/serving device perform a (another) shift-and-multiply operation SM2 on $X_{(0)}$ to generate $X'_{(1)}$, ..., $X'_{(N-1)}$. The shift-and-multiply operation SM2 is to circularly shift a first cooperative encoded sequence (e.g., $X_{(0)} = [X_q, X_{q+1}, ..., X_{q+\eta-1}]^T$) by "K" element, so as to obtain a circular-shifted sequence (e.g., $CS_K(X_{(0)}) = [X_{q+\eta-K}, X_{q+\eta-K+1}, ..., X_{q+\eta-1}, X_q, ..., X_{q+\eta-K-1}]^T$, where $CS_K(\cdot)$ denotes a circularly shifting operation corresponding to shifting "K" element, and a matrix representation of the circularly shifting operation $CS_K$ is the matrix $\tilde{M}_\eta^K$, $\tilde{M}_\eta$ expressed as eq. 3), and to multiply K leading elements of the circular-shifted sequence (e.g., $X_{q+\eta-K}, X_{q+\eta-K+1}, ..., X_{q+\eta-1}$ within $CS_K(X_{(0)})$) by the complex constant $\gamma$(e.g., i), so as to obtain a second cooperative encoded sequence (e.g., $X'_{(1)} = [i\,X_{q+\eta-K}, i\,X_{q+\eta-K+1}, ..., i\,X_{q+\eta-1}, X_q, ..., X_{q+\eta-K-1}]^T$).

Figure 6:
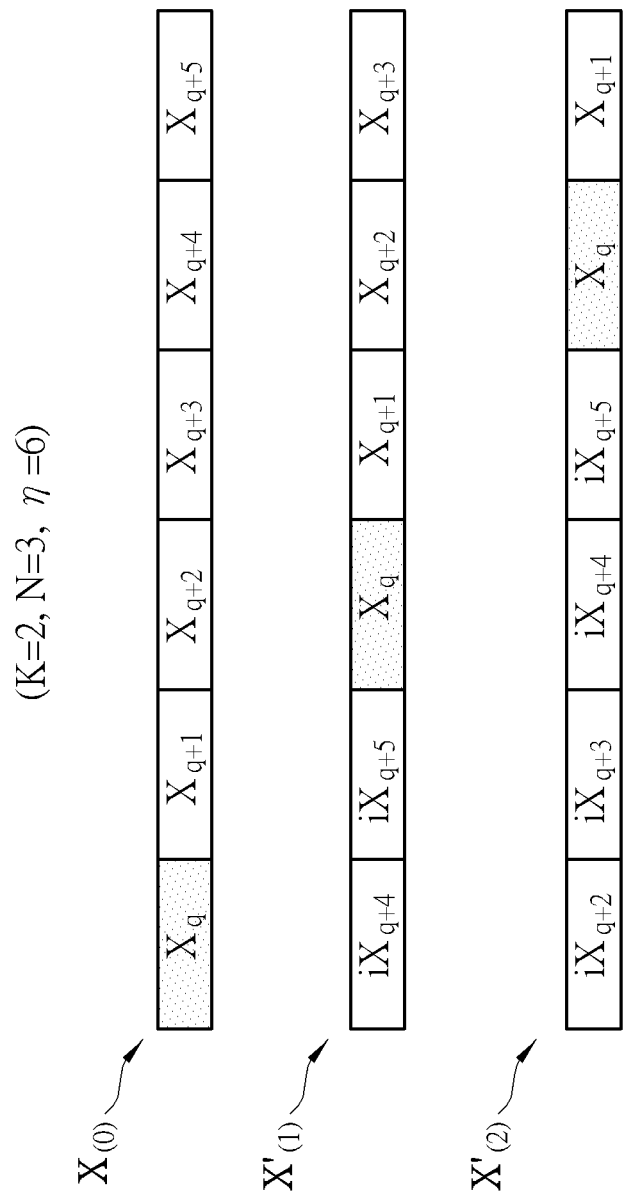
FIG. 6 illustrates a plurality of cooperative encoded sequences according to embodiments of the present application.

For simplicity, take K=2, N=3 and $\eta$=6 as an example, given $X_{(0)} = [X_q, X_{q+1}, X_{q+2}, X_{q+3}, X_{q+4}, X_{q+5}]^T$, from eq. 7, it can be obtained that $X'_{(1)} = [i\,X_{q+4}, i\,X_{q+5}, X_q, X_{q+1}, X_{q+2}, X_{q+3}]^T$ and $X'_{(2)} = [i\,X_{q+2}, i\,X_{q+3}, i\,X_{q+4}, i\,X_{q+5}, X_q, X_{q+1}]^T$, as FIG. 6 illustrates.

In Step 504, the coordinating device AN may arbitrarily assign one of the cooperative encoded sequences $X_{(0)}$, $X'_{(1)}$, ..., $X'_{(N-1)}$ to one of the serving stations AP_1-AP_N, and each serving station transmits its corresponding (assigned) cooperative encoded sequence to the user device UD.

Figure 7:
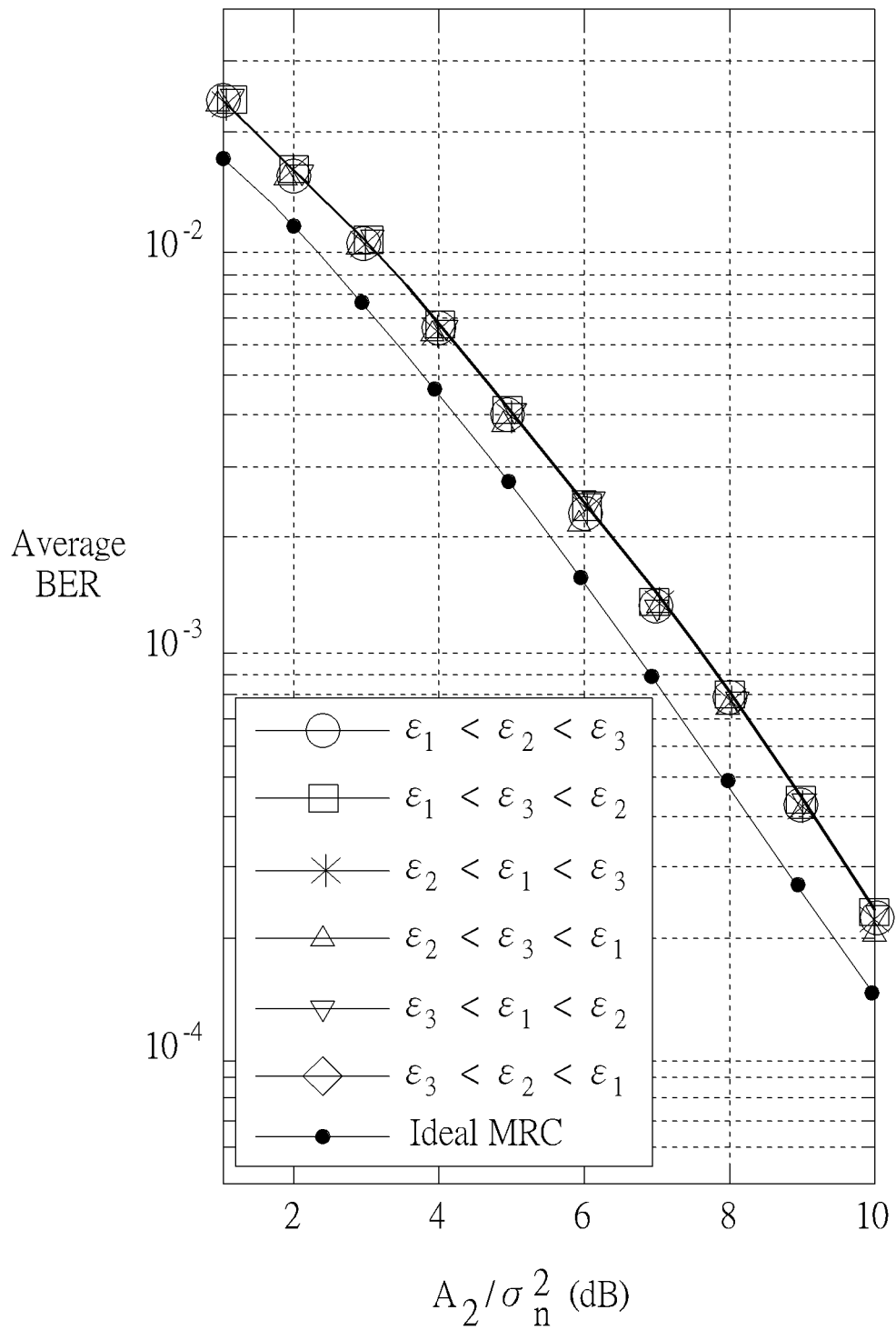
FIG. 7 illustrates BER performances of the cooperative encoded sequences according to an embodiment of the present application.

Rational behind the process 50 (especially Step 504) is that, given $X'_{(n)}$ is computed by eq. 7, according to simulation results, which serving station is assigned to transmit $X'_{(n)}$ would not affect link quality of BER performance. Specifically, FIG. 7 illustrates BER performances of the cooperative encoded sequences generated by eq. 7 in Step 502, under a scenario of K=2, N=3 and $\eta$=6, for different CFO parameter orderings. In addition, $A_1/A_2$=2 dB, $A_3/A_2$=−3 dB, $N_{rx}$=1 and $\varepsilon_1$, $\varepsilon_2$, $\varepsilon_3$ E {−0.3, 0.4, 0.45}. As can be seen from FIG. 7, for various CFO parameter orders, the corresponding BER performances perceived at the user device UD are substantially the same, as long as the cooperative encoded sequences are generated by eq. 7.

Inspired by the BER simulation results shown in FIG. 7, the present application utilizes Step 504 to arbitrarily assign one cooperative encoded sequence to one serving station.

Therefore, the communication system 10 performing the process 50 would also be able to deal with the multi-CFO issue. Note that, in the process 50, no CFO information feedback is needed.

In another perspective, the process 30 may be viewed as a close-loop cooperative precoding scheme, since the process 30 requires CFO feedback. On the other hand, the process 50 may be viewed as an open-loop cooperative precoding scheme, since the process 50 requires no CFO feedback.

In summary, the present application utilizes the shift-and-multiply operation to generate the cooperative encoded sequences. The present application may perform the (ascending) sorting operation on the CFO parameters corresponding to the serving stations, to determine which serving station is assigned to transmit which cooperative encoded sequence. Further, the present application may perform the shift-and-multiply operation with multiple shifted elements to generate the cooperative encoded sequences. In this case, the cooperative encoded sequence may be arbitrarily assigned to the serving stations. Both methods are able to combat against CFO imperfection.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A cooperative precoding method, applied in a communication system comprising a coordinating device and a plurality of serving stations, the cooperative precoding method comprising:
   the coordinating device obtaining a plurality of carrier frequency offset (CFO) parameters of the plurality of serving stations with respect to a user device;
   generating a plurality of cooperative encoded sequences;
   assigning the plurality of cooperative encoded sequences to the plurality of serving stations, respectively, according to an order of the plurality of CFO parameters; and
   the plurality of serving stations transmitting the plurality of cooperative encoded sequences, respectively, to the user device, wherein each cooperative encoded sequence is transmitted over a plurality of subcarriers.

2. The cooperative precoding method of claim 1, wherein the plurality of cooperative encoded sequences comprises an original sequence, the step of generating the plurality of cooperative encoded sequences comprises performing a shift-and-multiply operation zero, one or multiple times on the original sequence, and the shift-and-multiply operation zero comprises:
   obtaining a first cooperative encoded sequence;
   circularly shifting the first cooperative encoded sequence by one element, so as to obtain a circular-shifted sequence; and
   multiplying a leading element of the circular-shifted sequence by a complex constant, so as to obtain a second cooperative encoded sequence.

3. The cooperative precoding method of claim 2, wherein multiplying the leading element by the complex constant is equivalent to rotating the leading element 90 degrees in a complex plane.

4. The cooperative precoding method of claim 1, further comprising
   the coordinating device performing a sorting operation on the plurality of CFO parameters, so as to obtain an ordered CFO list;

wherein the step of assigning the plurality of cooperative encoded sequences comprises:
assigning the plurality of cooperative encoded sequences to the plurality of serving stations, respectively, according to the ordered CFO list.

5. The cooperative precoding method of claim 4, wherein the step of assigning the plurality of cooperative encoded sequences to the plurality of serving stations, respectively, according to the ordered CFO list comprises:
the coordinating device determining an operational times corresponding to a cooperative encoded sequence assigned for a serving station according a CFO parameter corresponding to the serving station within the ordered CFO list; and
performing a shift-and-multiply operation on an original sequence repeatedly by the operational times, so as to obtain the cooperative encoded sequence assigned to the serving station.

6. The cooperative precoding method of claim 5, wherein the step of determining the operational times comprises:
obtaining an index of the serving station within the ordered CFO list; and
determining the operational times according to the index.

7. The cooperative precoding method of claim 6, wherein the step of determining the operational times further comprises:
determining the operational times as the index minus 1.

8. The cooperative precoding method of claim 1, wherein a number of the plurality of subcarriers is greater than or equal to a number of the plurality of serving stations.

9. A cooperative precoding method, applied in a communication system comprising a coordinating device and a plurality of serving stations, the cooperative precoding method comprising:
generating a plurality of cooperative encoded sequences; and
the coordinating device coordinating the plurality of serving stations, such that the plurality of serving stations transmits the plurality of cooperative encoded sequences, respectively, to a user device, wherein each cooperative encoded sequence is transmitted over a plurality of sub carriers;
wherein the step of generating the plurality of cooperative encoded sequences comprises performing a shift-and-multiply operation zero, one or multiple times on an original sequence, and the shift-and-multiply operation zero comprises:
obtaining a first cooperative encoded sequence;
circularly shifting the first cooperative encoded sequence by K elements, so as to obtain a circular-shifted sequence, wherein K is an integer larger than 1; and
multiplying K leading elements of the circular-shifted sequence by a complex constant, so as to obtain a second cooperative encoded sequence.

10. The cooperative precoding method of claim 9, wherein multiplying the K leading elements by the complex constant is equivalent to rotating the K leading elements 90 degrees in a complex plane.

11. The cooperative precoding method of claim 9, wherein a number of the plurality of subcarriers is greater than or equal to K times a number of the plurality of serving stations.

12. A communication system, comprising:
a coordinating device; and
a plurality of serving stations, coupled to the coordinating device, configured to transmit a plurality of cooperative encoded sequences, respectively, to a user device, wherein each cooperative encoded sequence is transmitted over a plurality of subcarriers;
wherein the plurality of cooperative encoded sequences comprises an original sequence, the plurality of cooperative encoded sequence is generated, at the coordinating device, by performing a shift-and-multiply operation zero, one or multiple times on the original sequence, and the shift-and-multiply operation zero comprises:
obtaining a first cooperative encoded sequence;
circularly shifting the first cooperative encoded sequence by K elements, so as to obtain a circular-shifted sequence, wherein K is an integer larger than 1; and
multiplying K leading elements of the circular-shifted sequence by a complex constant, so as to obtain a second cooperative encoded sequence.

13. The communication system of claim 12, wherein multiplying the K leading elements by the complex constant is equivalent to rotating the K leading elements 90 degrees in a complex plane.

14. The communication system of claim 12, wherein a number of the plurality of subcarriers is greater than or equal to K times a number of the plurality of serving stations.

* * * * *